(12) United States Patent
Smits (10) Patent No.: US 8,014,681 B1
(45) Date of Patent: Sep. 6, 2011

(54) DEVICE WITH OPTICALLY TRANSPARENT HOUSING FOR CONDUCTING LIGHT SIGNALS AND METHODS OF MANUFACTURE AND USE

(75) Inventor: Gerard Dirk Smits, Los Gatos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 921 days.

(21) Appl. No.: 11/945,929

(22) Filed: Nov. 27, 2007

(51) Int. Cl.
*H04B 10/12* (2006.01)

(52) U.S. Cl. .......... 398/141; 398/128; 398/130; 398/60; 398/189

(58) Field of Classification Search .......... 398/135–141, 398/164, 128, 130, 168, 189, 60; 385/114
See application file for complete search history.

(56) References Cited

U.S. PATENT DOCUMENTS

| | | | | |
|---|---|---|---|---|
| 6,892,644 | B2 * | 5/2005 | Rastegar et al. | 102/213 |
| 7,184,617 | B2 * | 2/2007 | Korenaga et al. | 385/14 |
| 7,272,293 | B2 * | 9/2007 | Rastegar et al. | 385/147 |
| 7,338,193 | B1 * | 3/2008 | Zeiger et al. | 362/551 |
| 7,636,523 | B2 * | 12/2009 | Schorpp | 398/153 |
| 7,778,503 | B2 * | 8/2010 | Schorpp et al. | 385/14 |
| 2003/0063844 | A1 * | 4/2003 | Caracci et al. | 385/24 |
| 2006/0245757 | A1 * | 11/2006 | Elahmadi et al. | 398/135 |
| 2008/0159747 | A1 * | 7/2008 | Mahgerefteh et al. | 398/141 |

* cited by examiner

*Primary Examiner* — Ken N Vanderpuye
*Assistant Examiner* — Hibret A Woldekidan (57) ABSTRACT

A device can convert electrical signals into modulated light signals and conduct those modulated light signals between components within the device or between the device and another device through at least a portion of the housing of the device that is transparent to the light wavelength of the modulate light signals.

20 Claims, 7 Drawing Sheets

DEVICE WITH OPTICALLY TRANSPARENT HOUSING FOR CONDUCTING LIGHT SIGNALS AND METHODS OF MANUFACTURE AND USE

BACKGROUND OF THE INVENTION

Typical electronic devices conduct signals, such as data and control signals, between components of the device using electrical conductors, such as wires or traces on a printed circuit board or flex circuit. The flow of these electrical signals through the conductors generates electromagnetic fields that can generate noise in nearby circuits or components. Such noise is often referred to as "electromagnetic interference" or "EMI". EMI can be particularly problematic for devices, such as mobile phones, pagers, and personal digital assistants, that utilize wireless communication because the EMI injects noise into the radio frequency (RF) communications signals.

SUMMARY

This disclosure provides a device, system and method for conducting light signals through an optically transparent housing.

In one embodiment, a device includes a housing, first and second light emitters, a light receiver, and first and second electronic components. At least a portion of the housing is transparent to light. The first light emitter is disposed in the housing. When directed by a first electrical signal having a plurality of bits, the first light emitter is configured to emit a first modulated light signal representing at least a first bit of the first electrical signal. Light of the first modulated light signal has a first value of a first characteristic. The second light emitter is also disposed in the housing. When directed by the first electrical signal, the second light emitter is configured to emit a second modulated light signal representing at least a second bit of the first electrical signal. Light of the second modulated light signal has a second value of the first characteristic. The light receiver is disposed in the housing and is configured to receive at least a first portion of the first modulated light signal and at least a second portion of the second modulated light signal from the housing. The light receiver is also configured to convert at least the received first and second portions into at least first and second bits, respectively, of a second electrical signal. The first electronic component is disposed in the housing and is configured to provide the first electrical signal to the first light emitter. The second electronic component is also disposed in the housing and is configured to receive the second electrical signal from the first light receiver.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct connection between the items connected, or an indirect connection through one or more passive or active intermediary devices.

The present invention is directed to the area of devices with a housing (e.g., case) that can be used to carry light signals (e.g., modulated light signals) between components within or near the housing, and methods of manufacture and use of such devices. For example, the device can include a housing, at least a portion of which is transparent to light having a particular wavelength; a light emitter disposed in the housing to emit light having the particular wavelength; and a light receiver also disposed in the housing. The housing of the device can conduct modulated light signals, emitted by the light emitter into the housing, to the light receiver. In at least some embodiments, this transmission of light signals can be performed as an alternative to wired or wireless transmission of electrical signals between components in the device. An advantage of transmitting modulated light signals instead of electrical signals is that the modulated light signals do not generate electromagnetic interference (EMI).

In addition to intra-device communication between devices components, modulated light signals can also be used to communicate with external devices via light signals conducted (e.g., laterally conducted) through the device housing. For example, the device can include a port in the housing into which a connector can be plugged to receive the modulated light signals from the housing. The modulated light signal, or an electrical signal generated by a light receiver in the connector in response to the modulated light signal, can be transmitted to the external device. Conversely, modulated light signals can be injected into the housing, for reception by light receiver(s) in the device, from the connector using a light emitter in the connector (coupled to an external device) or the external device.

Figure 1:
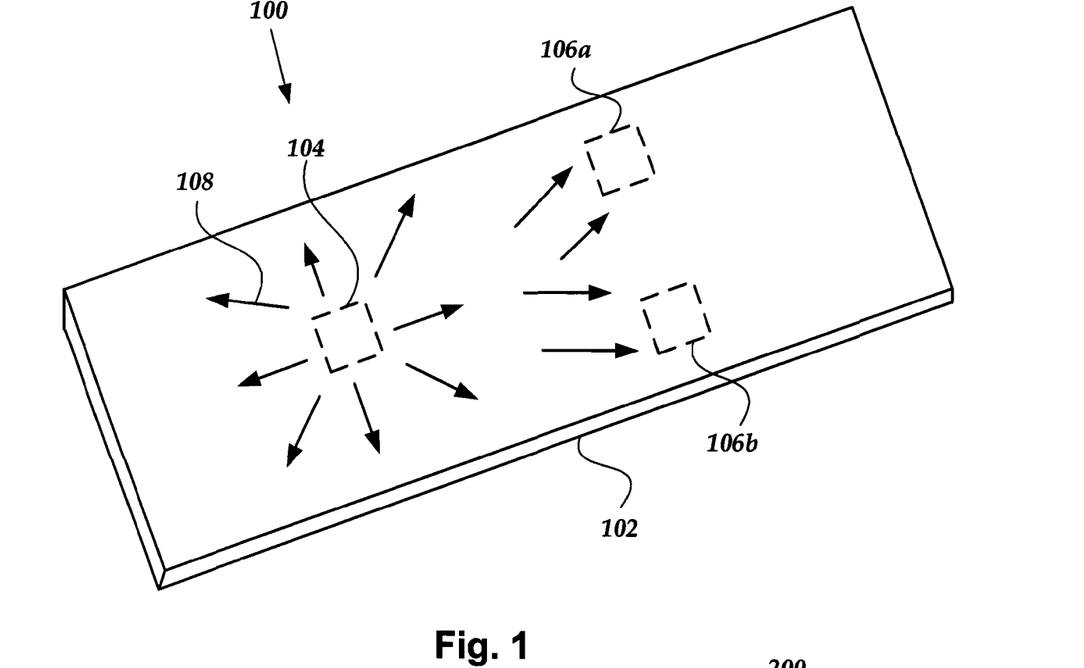
FIG. 1 is a schematic perspective view of one embodiment of a device with a housing through which light signals can be conducted, according to the invention.

FIG. 1 is a schematic representation of one embodiment of a device 100 that includes a housing 102, one or more light emitters 104 disposed in the housing (as represented by the dashed lines), and one or more light receivers 106a, 106b also disposed in the housing. At least a portion of the housing 102 is transparent to light 108 emitted by the light emitter(s) 104 so that the light from the light emitter(s) is conducted via the housing to the light receiver(s) 106a, 106b. The light from the light emitter(s) can be in the form of a modulated light signal that can be used to transmit data, control signals, a clock signal, any other suitable signal, or any combination thereof. The modulated light signal can be digital or analog.

The portion of the housing 102 transparent to light 108 emitted by the light emitter(s) 104 can be the case of the device or only a portion of the case (e.g., a top or bottom portion of the case.) In some embodiments, the portion of the housing transparent to light emitted by the light emitter(s) can be one or more coatings disposed on a surface of the case of the device. For example, a plastic coating may be disposed on the interior or exterior surface of the case and light can be injected into the plastic coating from the light emitter(s) and conducted through the plastic coating to the light receiver(s). The coating may be patterned on the case or may cover a substantial portion, or even all, of the case of the device. It will be understood that the device in FIG. 1 and other embodiments described herein may be a stand-alone device or may be a part of a larger apparatus (e.g., a computer, a telephone, a car, a GPS device, instrumentation (particularly RF or EMI susceptible instrumentation) and the like.) It will also be understood that the housing or case need not surround the entire device. For example, the device may be a component that fits in a larger apparatus and the housing or case is only provided around the top and sides of the device.

Figure 2:
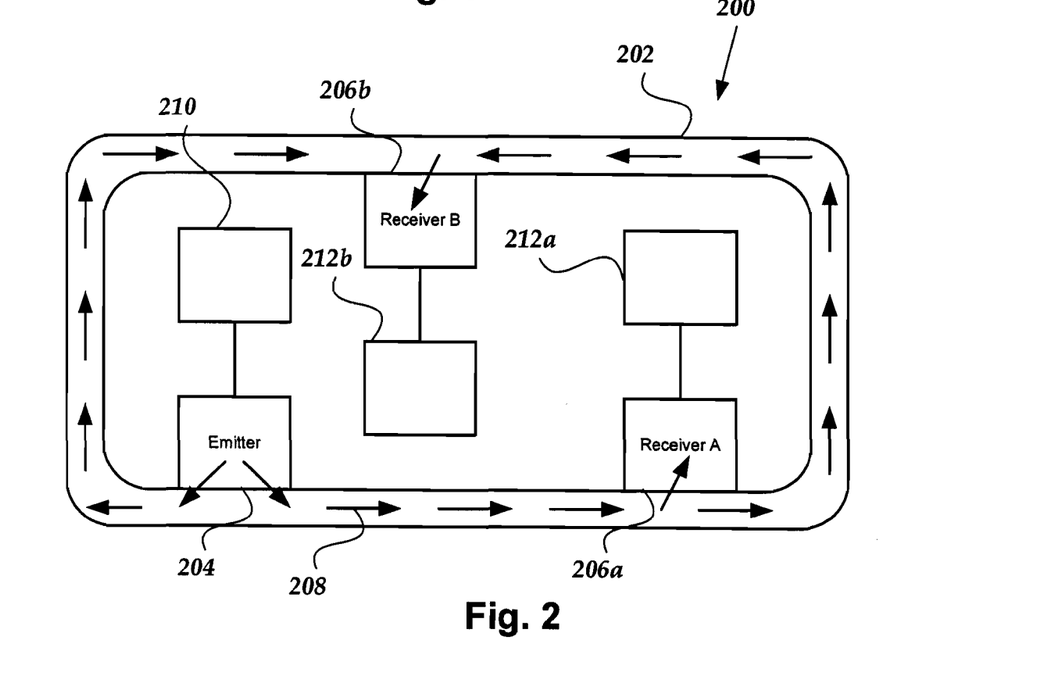
FIG. 2 is a schematic two-dimensional representation of another embodiment of a device with a housing through which light signals can be conducted, according to the invention.

In one embodiment, the device may be constructed with all of its components and then the housing may be filled with a transparent material, such as a polymer, that hardens to provide a sealed device that is generally water-resistant. Preferably, the transparent material is water-repellant. Such a device may also be more shock resistant because components will generally FIG. 2 illustrates one embodiment of a device in a simplified two-dimensional representation. It will be understood that the concepts described herein can be applied in three dimensions as illustrated, for example, in the embodiment of FIG. 1. The device 200 includes a housing 202, at least one light emitter 204, and at least one light receiver 206a, 206b. The emitter 204 emits a light signal 208 into the housing 202 and the light receiver(s) 206a, 206b can receive the light signal. In the illustrated embodiment, a device component 210 provides an electrical signal to the light emitter 204. The light emitter 204 converts the electrical signal into a light signal 208 which the light emitter 204 emits into the housing 202. The light signal 208 is then received by one or more light receivers 206a, 206b which convert the light signal into an electrical signal and convey that electrical signal to a respective device component 212a, 212b.

Transmission of the light through the housing and retention of light within the housing can be accomplished using a suitable method including, but not limited to, total internal reflection. Light can be totally internally reflected when the light approaches an interface between two materials at an angle that is equal to or greater than the critical angle, $\theta_c$, wherein $\sin(\theta_c)=n_t/n_i$, where $n_i$ is the index of refraction of the material that the light is traveling through to reach the interface and $n_t$ is the index of refraction of the material on the other side of the interface. The angle is measured from a line orthogonal to the interface. In at least some embodiments, the index of refraction of the material of the housing is sufficiently high with respect to the surrounding material (e.g., air, a low refractive index plastic, or the like) so that a substantial amount (at least 10%, 25%, 50%, 75%, 90%, 95% or 99%) of light emitted into the housing from the light emitter will be totally internally reflected. The shape of the housing and the positions of the light emitter(s) and light receiver(s) may be selected to facilitate transmission of light through the housing by total internal reflection. For example, the light emitter 204 and light receiver 206a may be positioned adjacent to the same substantially flat surface of the housing 202, as illustrated in FIG. 2. As another example, the housing may be constructed with no (or only a few) sharp angles.

Figure 3:
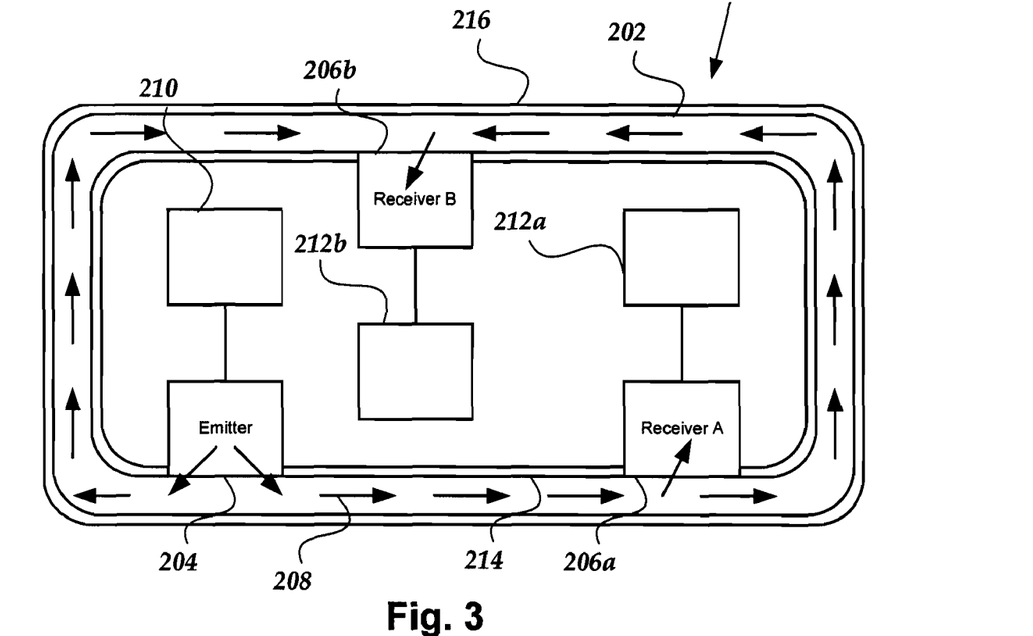
FIG. 3 is a schematic two-dimensional representation of a third embodiment of a device with a housing through which light signals can be conducted, according to the invention.

Additionally or alternatively, a portion of the exterior surface or interior surface (or both) of the portion of the housing that conducts the light signal can be covered by a reflective layer 214, 216, as illustrated in FIG. 3. The reflective layer can be positioned over the entire exterior surface or interior surface (except where the light emitter and light receivers are attached) of the housing or both or the reflective layer can be provided over only portions of the exterior or interior surfaces (or both) of the housing, particularly at points, such as corners, where light might be lost. The reflective layer 214, 216 can be a polychromatic or monochromatic reflecting material preferably that reflects the light emitted by the light emitter(s). The reflective layer 214, 216 can be a specular or diffuse reflecting material.

Any suitable light emitter can be used. The light emitter can be polychromatic or monochromatic. Examples of suitable light emitters include, but are not limited to, light emitting diodes (LEDs), lamps, lasers (e.g., a vertical cavity surface-emitting laser—VCSEL), and the like. In at least some embodiments, the light emitter is a substantially monochromatic LED. Polychromatic light emitters can also be used to generate monochromatic light signals by incorporating filters.

Optionally, the light emitter can be coupled with one or more optical elements, such as filters, reflectors, refractors, collimators, prisms, polarizers, lenses (including Fresnel lenses), and the like to provide light signals to the housing. These optical elements can be independent optical elements or they may be part of the housing. For example, a portion of the housing might be fashioned into a lens or may be covered with a reflective material to form a mirror.

Figures 11, 12, 13, 14:
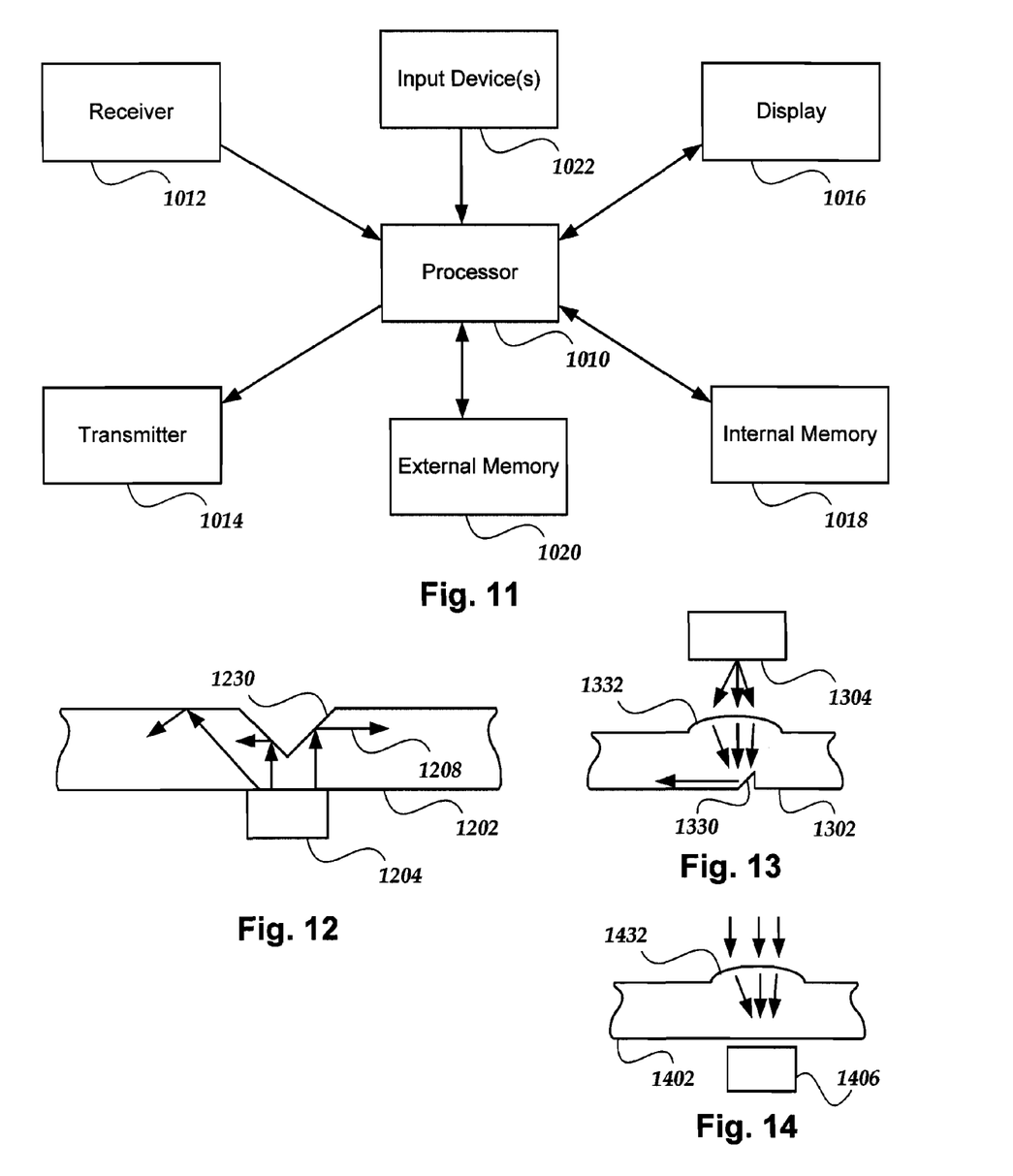
FIG. 11 is a schematic block diagram of one embodiment of a system that can utilize light signals conducted through a device housing to communicate between internal or external device components, according to the invention.
FIG. 12 is a schematic cross-sectional view of one embodiment of a portion of a housing with a feature formed in the housing to redirect light from a light emitter.
FIG. 13 is a schematic cross-sectional view of another embodiment of a portion of a housing with a lens feature and a feature formed in the housing to redirect light from a light emitter.
FIG. 14 is a schematic cross-sectional view of one embodiment of a portion of a housing with a lens feature to direct light toward a light receiver.

FIG. 12 illustrates one example of a housing 1202 that includes an indentation 1230 (e.g., a divot or prism-like cut) in the housing to facilitate reflection of light 1208 emitted by a light emitter 1204. The angle of the indentation may be selected to produce total internal reflection of at least a portion of the light from the light emitter or the indentation may be covered with a reflective material. Optionally, the indentation may be filled, although if total internal reflection is preferred leaving the indentation open to air will typically provide the largest difference in refractive indices.

FIG. 13 illustrates another example of a housing 1302 that includes a lens element 1332 and a reflecting element 1330 that can receive light from a light emitter 1304 and direct the light through the housing 1302. It will be understood that this arrangement can be useful if the light emitter 1304 is within the housing 1302 or outside the housing.

LEDs and similar devices are particularly useful because they can be attached directly to the housing adhesive. Any suitable adhesive can be used including optical adhesives. Preferably, the adhesive is transparent to the light emitted by the LED and can assist in refractive index matching the LED and the housing. It will be recognized, however, that the light emitter may not be directly attached to the housing but could transmit light to the housing through air or any other medium. In at least some embodiment, the housing may include a hollow or divot in the housing wall into which the light emitter can be at least partially placed to facilitate coupling of light into the housing.

The wavelength of the emitted light can be selected to be any suitable wavelength including any wavelength selected from the visible, infrared, and ultraviolet regions of the electromagnetic spectrum. In at least some embodiments, the device includes multiple light emitters. Two or more of the multiple light emitters (preferably emitting light at the same wavelength) can be used to provide a more intense single signal. Alternatively or additionally, the multiple light emitters can be used to provide different light signals or multi-bit light signals. These multiple light emitters may be selected to provide light with different wavelengths (e.g., red, blue, and green). Alternatively or additionally, the light emitters may be selected to deliver light with different polarizations (e.g., different linear, circular, or elliptical polarizations). Polarizing the emitted light may be accomplished, for example, using one or more polarizers.

The light signals generated using the light emitter(s) can be modulated light signals. Any suitable modulation frequency can be selected for the light signals and can be, for example, the Hz, kHz, MHz, or GHz ranges or even higher. In some embodiments, the modulation frequency can be in the range of 10 kHz to 10 GHz or in the range of 1 MHz to 1 GHz. The maximum modulation frequency achievable may be limited by factors such as, for example, the switching speed of the light emitter or the detection speed of the light receiver. Modulated light signals are particularly adept for transmitting digital signals. Any modulation technique, including any standard modulation technique, can be used including, but not limited to, modulation of amplitude, frequency, phase shift, and any combination thereof.

Any suitable light receiver can be used including, but not limited to, photodiodes, photomultipliers, charge-coupled devices (CCD), CMOS detectors, and the like. The light receiver may include a single light detector or an array of detectors (e.g., a CMOS or CCD array or array of photodiodes or photomultipliers.) The detector may be integrated with other elements in the device. For example, the detector may be part of a microchip that also provides other functions for the device beyond just acting as a detector. In at least some embodiments, a light receiver may be selected that is more responsive to light of a particular wavelength emitted by one of the light emitters and less responsive (or even non-responsive) to light emitted at other wavelengths by other light emitters. Alternatively or additionally, one or more filters can be used with the light receiver for wavelength selection or one or more polarizers can be used for polarization selection. In at least some embodiments, a light emitter may be selected based on the wavelength sensitivities of the light receiver(s).

Optionally, the light receiver can be coupled with one or more optical elements, such as filters, reflectors, refractors, collimators, prisms, polarizers, and the like to provide light signals to the housing. These optical elements can be independent optical elements or they may be part of the housing.

FIG. 14 illustrates another example of a housing 1402 that includes a lens element 1432 that can direct light 1408 toward a light receiver 1406. It will be understood that this arrangement can be useful if the light receiver 1406 is within the housing 1402 or outside the housing.

In at least some embodiments, the light receiver is attached to the housing. For example, the light receiver may be attached by an adhesive, such as an optical adhesive. In other embodiments, the light receiver may not be attached to the housing, but instead receive the light signals through an air interface.

Figure 4:
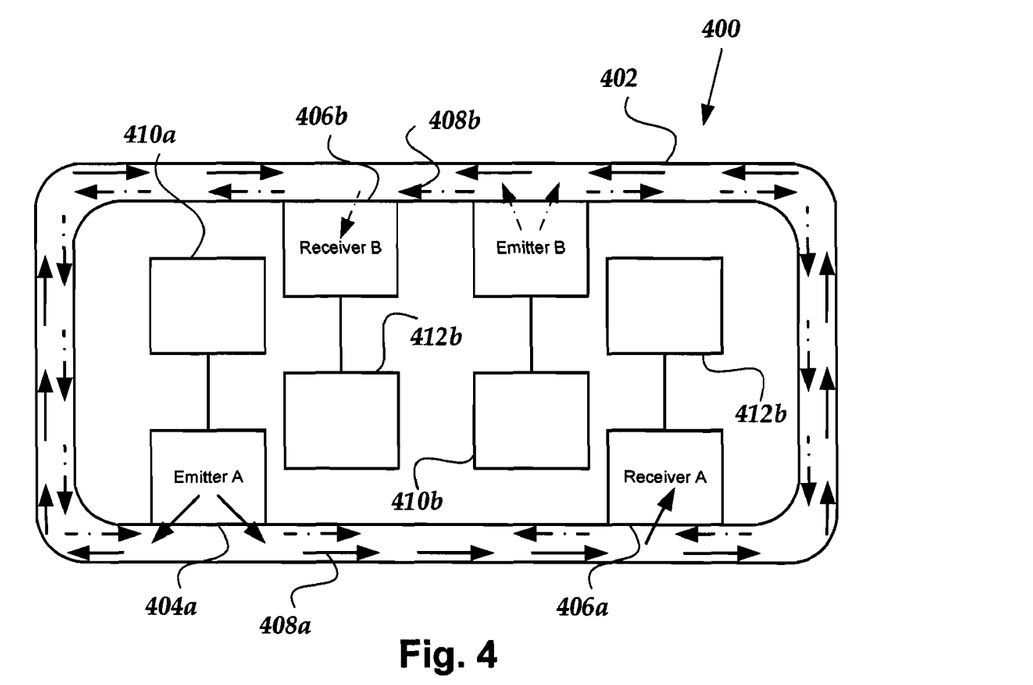
FIG. 4 is a schematic two-dimensional representation of a fourth embodiment of a device with a housing through which light signals can be conducted, according to the invention.

FIG. 4 illustrates one embodiment of a device 400 utilizing multiple light emitters 404a, 404b coupled to electronic components 410a, 410b. Each of the light emitters 404a, 404b, provides light 408a, 408b of a different wavelength or polarization. A respective light receiver 406a, 406b receives and processes the emitted light and provides electrical signals to electronic components 412a, 412b, respectively. For example, emitter A 404a emits a light signal 408a at a particular light wavelength (e.g., red) and receiver A 406a receives and processes the light 408a. Receiver B 406b, on the other hand, may be configured so that even if light signal 408a impinges on the receiver B it does not process the light signal. For example, receiver B may be less responsive (or non-responsive) to the wavelength of light signal 408a or receiver B may utilize a color filter or polarizer to filter out light signal 408a or receiver B may simply be too far away from emitter A to receive light signal 408a with sufficient intensity to register. Similarly, emitter B 404b emits a light signal 408b that is received and processed by light receiver B 406b and not light receiver A 406a.

Figure 5:
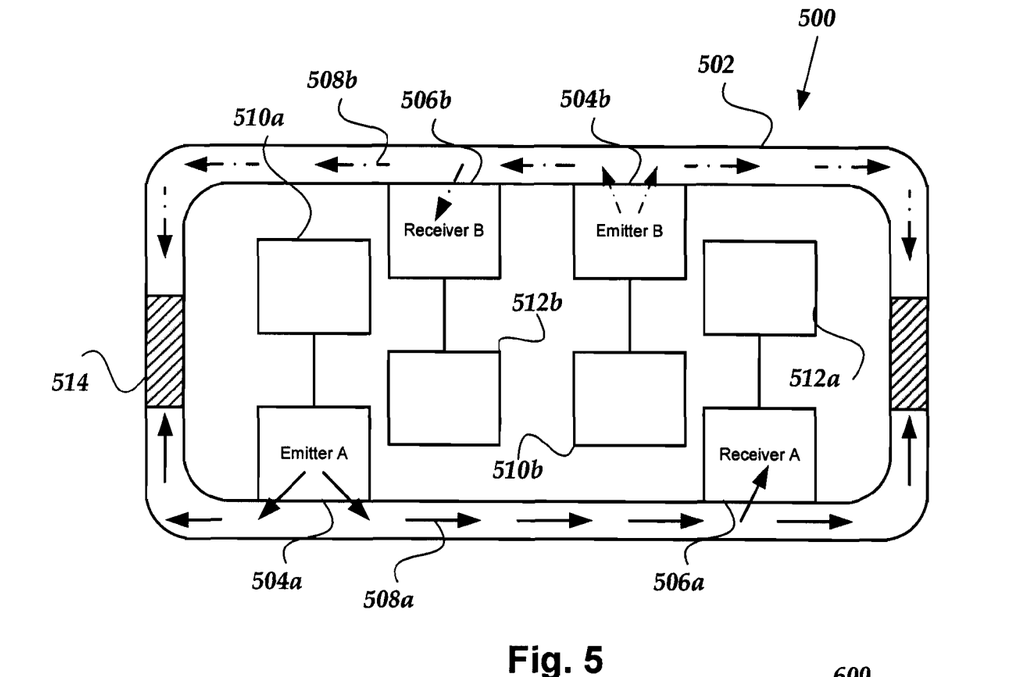
FIG. 5 is a schematic two-dimensional representation of a fifth embodiment of a device with a housing through which light signals can be conducted, according to the invention.

FIG. 5 illustrates another embodiment of a device 500 utilizing multiple light emitters 504a, 504b coupled to electronic components 510a, 510b and multiple light receivers 506a, 506b coupled to electronic components 512a, 512b. In this embodiment, the housing 502 includes one or more light attenuation zones 514 to attenuate the light from the emitters. The light attenuation zones 514 can be, for example, one or more portions of the housing that absorb light emitted by one or more of the light emitters 504a, 504b or one or more portions of the housing that scatter the light out of the housing. In some embodiments, the housing may include one or more light attenuation zones that form bands that separate portions of the housing into regions for a particular light emitter (or subset of the light emitters) and corresponding light receiver(s). In this manner, light emitters 504a, 504b can emit the same wavelength or polarization of light without generating unwanted cross-talk between emitter/receiver pairs (e.g., light emitter 504a and light receiver 506b or light emitter 504b and light receiver 506a).

Returning to FIG. 3, it will be understood that multiple light emitters are not necessary to provide signals to different receivers. As illustrated in FIG. 3, light emitter 204 can provide light signals 208 via the housing 202 to receiver A 206a and receiver B 206b. As one example of operation, the light receivers 206a, 206b may be configured to only receive and process light signals during a particular time period. For example, light receiver 206a may receive and process the light signal 208 during a first time period and then become inactive and light receiver 206b can then receive and process the light signal during a subsequent second time period. Any pattern (e.g., alternating) of time periods for the receivers can be used. Any length of the time periods can be used and the time periods may have the same or different lengths and they may have constant or varying lengths. The pattern may be automatic or a separate control signal may be used to activate a particular light receiver when the receiver should detect the signal.

In another example, a light signal 208 may have a receiver identifier code which indicates which light receiver should process the light signal. The other light receivers will typically not process the signal. In such embodiments, the light signal may have an "end of message" identifier to indicate to the light receivers that a new receiver identifier code will be transmitted.

Figure 6:
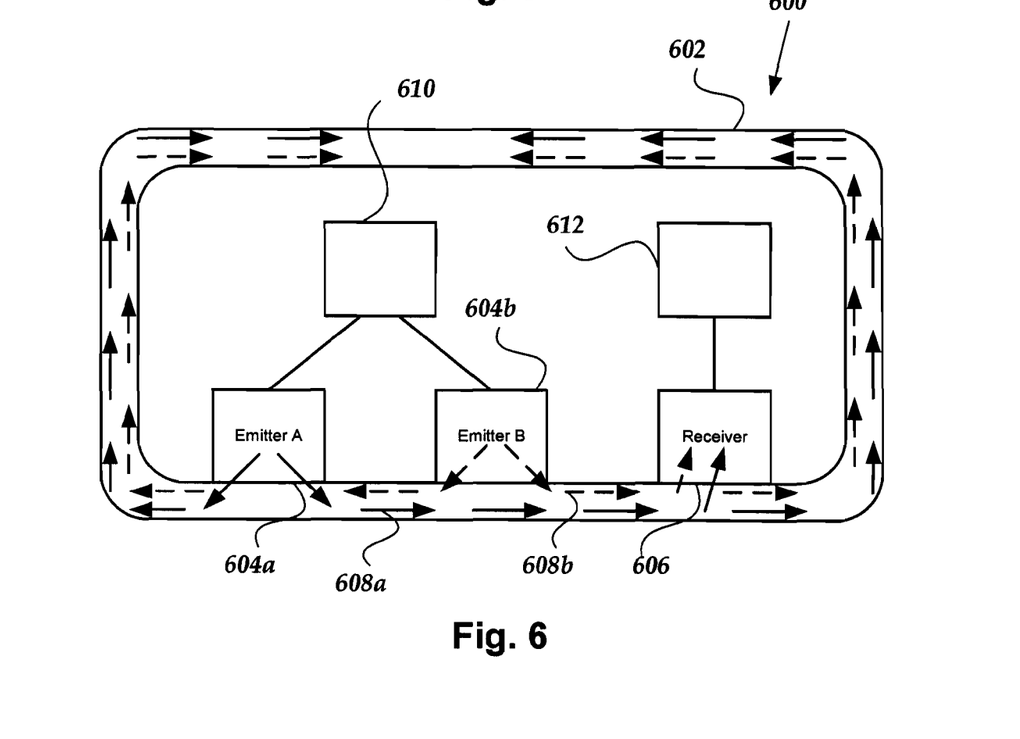
FIG. 6 is a schematic two-dimensional representation of a sixth embodiment of a device with a housing through which light signals can be v, according to the invention.

Multiple light emitters can also be used to provide a multi-bit light signal. FIG. 6 illustrates one embodiment of a device 600 with multiple light emitters 604a, 604b, coupled to electronic component 610, that emit light signals 608a, 608b with different light wavelengths (e.g., red and blue) or different polarizations for reception by receiver 606 which is coupled to electronic component 612. The combination of light signals 608a, 608b can be used to provide a 2-bit signal with four different states (e.g., off/off, on/off, off/on, on/on referring to the state of light emitters 604a and 604b respectively). It will be understood that arrangements with more light emitters can be used to create even higher-bit signals, for example, a 3-bit signal using three colors (red, blue, green) or a 4-bit, 5-bit, or 6-bit signal.

Figure 7:
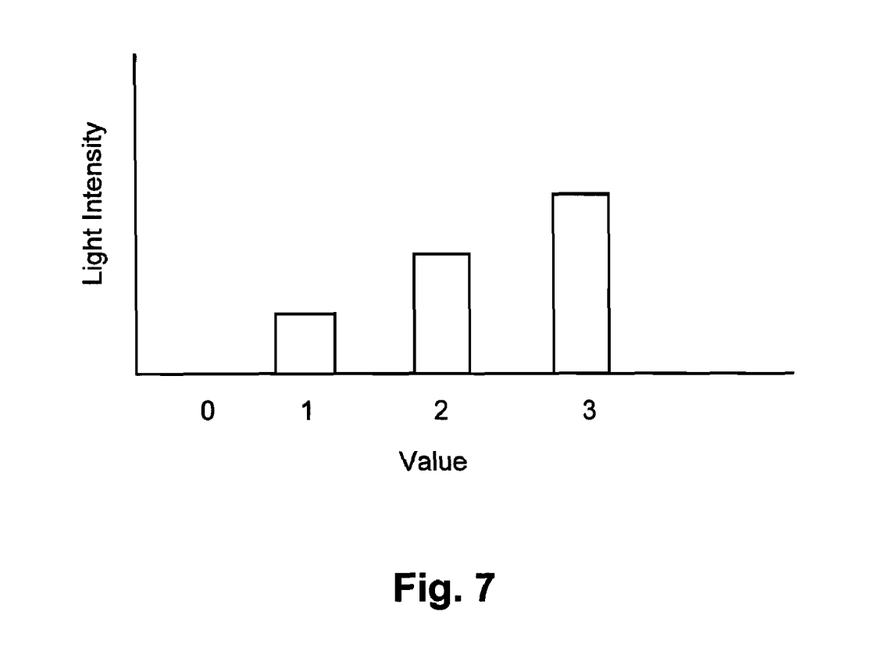
FIG. 7 is a schematic graph of light intensity versus value for a multi-bit signal scheme, according to the invention.

Additionally or alternatively, the intensity of the light signal emitted by the light emitter(s) can be used to generate multi-bit signals. FIG. 7 is a graph of intensity versus bit value for one example of a 2-bit signal with four different intensity levels (including the off state) for the light emitter. It will be understood that this scheme can also be combined with a multi-color or multi-polarization arrangement to provide multi-bit signals. For example, two light emitters with different colors and four intensity levels can produce a 4-bit signal.

Any suitable material can be used for the housing. Typically, at least a portion of the housing is substantially transparent (preferably, at least 50%, 75%, 90%, 95%, or 99%) to the wavelength(s) of light emitted by the light emitter(s). Suitable materials for at least the light conducting portion of the housing (or a coating on the case, as discussed above) include, but are not limited to, plastic, glass, quartz, and the like. The material of the housing can be selected by upon a variety of factors including, for example, cost, manufacturability, durability, transparency to the light from the light emitter(s), index of refraction, and the like.

As indicated above, the housing may include light attenuation zones. The housing may also include waveguiding structures formed in the housing to facilitate the transmission of light along the waveguide. Such waveguiding structures, however, are not in general necessary for the invention. By selection of suitable light emitter(s) and light receiver(s) and the placement of these components, light signals can be transmitted via the housing of the device even when the light is distributed in all directions (as illustrated in FIG. 1.)

Figure 8:
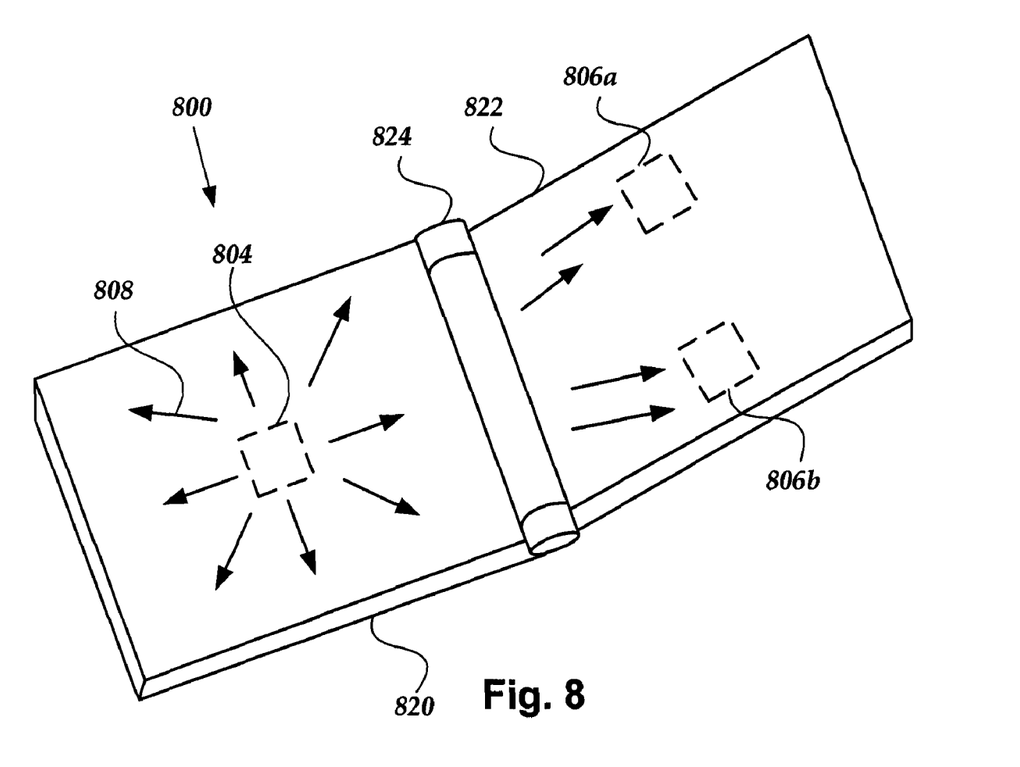
FIG. 8 is a schematic perspective view of a seventh embodiment of a device with a housing through which light signals can be conducted, the device including a hinge between two device portions, according to the invention.

FIG. 8 illustrates one embodiment of a device 800 that includes two portions 820 and 822 coupled together by a hinge 824. The materials of the housing of the two portions 820, 822 as well as the hinge 824 can be selected so that a light signal 808 emitted by a light emitter 804 into the housing of one portion (e.g., portion 820) can be transmitted through the hinge into the housing of the other portion (e.g., portion 822) and to one or more light receivers 806a, 806b in that portion of the device 800. This arrangement can be advantageous over conventional electrical circuitry which requires the use of wires or other conductors disposed within the hinge to carry electrical signals between the two portions of the device. Examples of device 800 include, but are not limited to, mobile phones, pagers, mobile video or audio players or recorders, personal digital assistants, and the like. As an example, in a mobile phone the light emitter 804 could be coupled to a processor in portion 820 of the phone. The processor could use the light emitter 804 to communicate via light signals 808 conducted through the housing of the phone with a light receiver 806a in portion 822 of the phone that is coupled to a phone display. In this manner, the processor can communicate the information that is to be displayed on the phone display using modulated light signals instead of electrical signals that cross over the hinge of the phone.

It will be recognized that portions of a device can be connected by structures other than a hinge. For example, the portions can be connected by a tether or cord. The tether or cord can act as an optical fiber and transmit the light signals from one portion of the device to another.

Generally, the light emitter should produce sufficient light intensity to convey a detectable light signal to each light receiver. It will be recognized that the light intensity detected at the receiver will typically be less than the light emitted for a variety of reasons including, but not limited to, the distribution of light to other portions of the device; light loss due to absorption by the housing or scattering out of the housing; and the like. Such attenuation of light intensity is expected.

Figure 9:
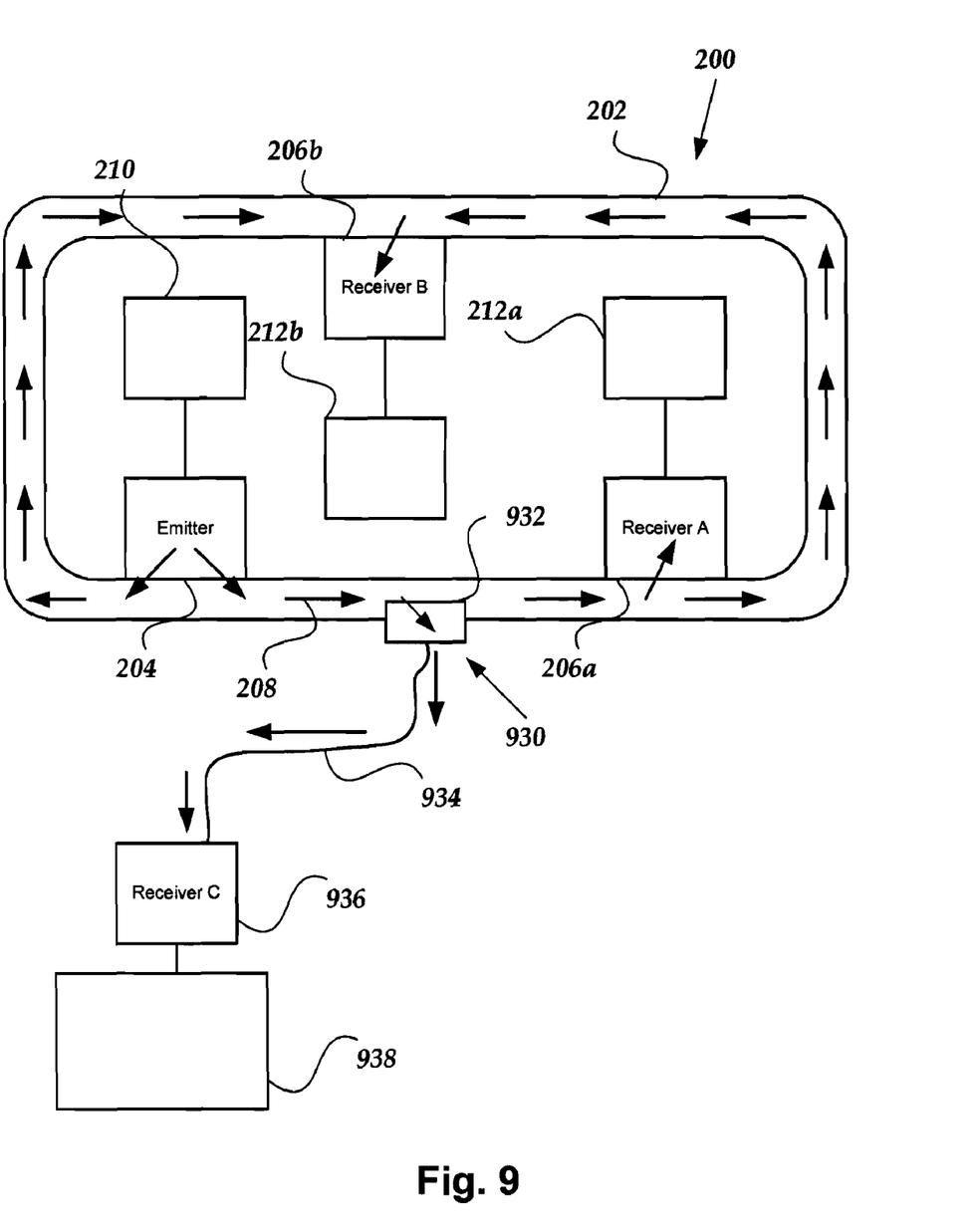
FIG. 9 is a schematic representation of an embodiment of a system that permits transmitting signals to or from an external device through a device housing light, according to the invention.

The light emitter(s) and light receiver(s) of the device can also be used to communicate with external devices. FIG. 9 illustrates one embodiment of the device 200 of FIG. 2 that includes a port 930 into which a connector 932 can be plugged to receive light signals from the device 200 or provide light signals to the device 200. In some embodiments, the light signals can be transmitted along a conduit 934 (e.g., an optical fiber) to an external light receiver 936 (or an external light emitter if light signals are being provided to device 200) this is coupled to, or part of, an external device 938. The light receiver 936 converts the light signals from the device 200 into an electrical signal that is provided to external device 938.

Figure 10:
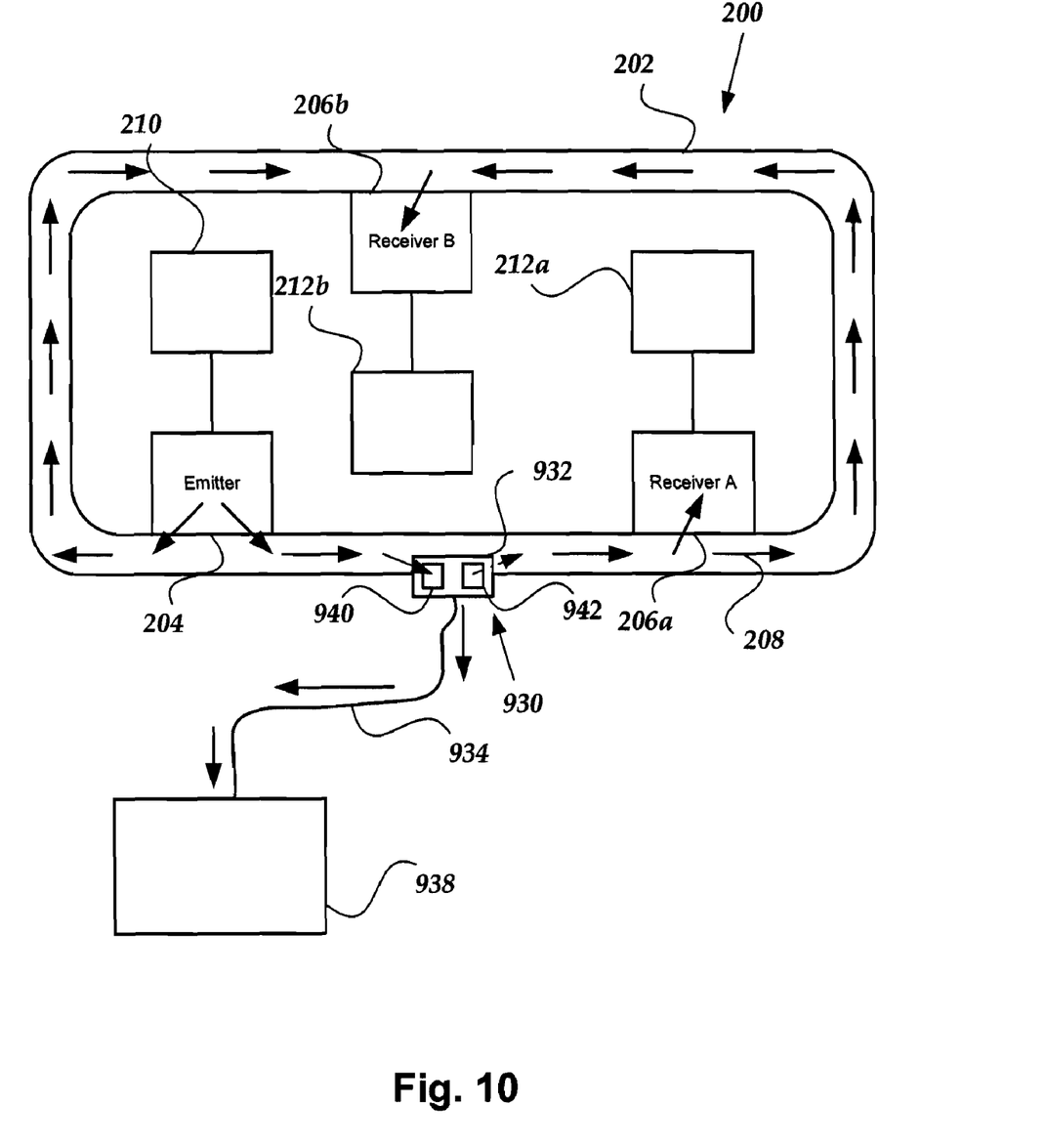
FIG. 10 is a schematic representation of a second embodiment of a system that permits transmitting signals to or from an external device through a device housing light, according to the invention.

FIG. 10 illustrates another embodiment in which the connector 932 includes a light receiver 940 and a light emitter 942. It will be understood that other embodiments may include only a light receiver or a light emitter. The light receiver 940 can receive the light signal 208 from the light emitter 204 via the housing 102 of the device 200 and convert that light signal to an electrical signal that is then conveyed to an external device 938 through a conduit 936 (or, alternatively or additionally, by wireless transmission to the external device 938.) The light emitter 932 can receive an electrical signal from the external device 938 and convert that into a light signal that is emitted into the housing 202 of the device 200 for transmission to one or more light receivers 206a, 206b in the device 200.

The embodiments described herein can be incorporated in a wide variety of devices including, but not limited to, mobile phone, cordless phones, pagers, PDAs, computers, GPS devices, and the like. To illustrate the versatility of the invention, FIG. 11 is a block diagram illustrating components that might be used in, and with, a mobile phone, pager, PDA, computer, or GPS device. The components include a processor 1010, a receiver 1012, a transmitter 1014, a display 1016, internal memory component(s) 1018, external memory device(s) 1020 (e.g., an external hard drive, diskette, memory disk, flash memory card, etc.), and input device(s) 1022 (e.g., a keyboard, mouse, trackball, touchpad, etc.) Modulated light signals conducted through the housing of the device can be used to communicate between these components. For example, the embodiments illustrated in FIGS. 1-6 and 8 can be used to facilitate communication between two or more of the components within the device such as the processor 1010, receiver 1012, transmitter 1014, display 1016, internal memory 1018, and internal input device(s) 1022. For example, the device may use the modulated light signals conducted through the housing to communicate information between the processor 1010 and the internal memory 1018 or between the processor 1010 and the display 1016. In addition, modulated light signals can be used to convey signals outside of the device, for example, between the processor 1010 and external memory 1020 or an external input device 1022, using, for example, the embodiments described with respect to FIGS. 9 and 10. It will also be understood that modulated light signals conducted through the housing of the device may also be used between subparts of a particular component, for example, between subprocessors that form the processor 1010.

Alternatively or additionally, the modulated light signals conducted by the housing can be transmitted to other devices through the air and without a separate connector and conduit (such as those illustrated in FIGS. 9 and 10). Moreover, the housing may receive modulated light signals from other devices by transmission through air without a separate connector and conduit. The housing can then be used to conduct the received modulated light signals to light receivers within the housing.

In one embodiment, the housing may include a Faraday cage or other shielding around electronic components within the housing to reduce or eliminate EMI or RF interference. In this embodiment, the light emitter, electrically coupled to the shielded component(s), and light-conducting housing can be used to communicate with other devices outside the Faraday cage or shielding.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A device, comprising:
    a housing, wherein at least a portion of the housing is transparent to light;
    a first light emitter disposed in the housing and configured to, when directed by a first electrical signal comprising a plurality of bits, emit light having a first value of a first characteristic as a first modulated light signal representing at least a first bit of the first electrical signal, wherein the device is configured to conduct the first modulated light signal through at least the portion of the housing that is transparent to light, and wherein the first characteristic is at least one of a first wavelength, a first polarization, and a first intensity;
    a second light emitter disposed in the housing and configured to, when directed by the first electrical signal, emit light having a second value of the first characteristic as a second modulated light signal representing at least a second bit of the first electrical signal, wherein the device is configured to conduct the second modulated light signal through at least the portion of the housing that is transparent to light;
    a first light receiver disposed in the housing and configured to receive at least a first portion of the first modulated light signal and at least a second portion of the second modulated light signal from the housing and convert at least the received first and second portions into at least first and second bits, respectively, of a second electrical signal;
    a first electronic component disposed in the housing and configured to provide the first electrical signal to the first light emitter; and
    a second electronic component disposed in the housing and configured to receive the second electrical signal from the first light receiver.

2. The device of claim 1, further comprising:
    a third light emitter disposed in the housing and configured to, when directed by a third electrical signal, emit light having a third value of a second characteristic as a third modulated light signal;
    wherein the device is configured to conduct the third modulated light signal through at least the portion of the housing that is transparent to light; and
    wherein the second characteristic is at least one of a second wavelength, a second polarization, and a second intensity.

3. The device of claim 2, wherein the first and third modulated light signals comprise a multi-bit light signal.

4. The device of claim 2, further comprising:
    a second light receiver disposed in the housing and configured to receive at least a portion of the third modulated light signal from the housing and convert at least the received portion of the third modulated light signal into a fourth electrical signal.

5. The device of claim 4, wherein the first light receiver is substantially non-responsive to light having the second characteristic, and the second light receiver is substantially non-responsive to light having the first characteristic.

6. The device of claim 1, further comprising:
    a second light receiver disposed in the housing and configured to receive at least a portion of the first modulated light signal from the housing and convert at least the received portion of the first modulated light signal into a third electrical signal; and a third electronic component disposed in the housing and configured to receive the third electrical signal from the second light receiver.

7. The device of claim 1, wherein at least a portion of a surface of the housing is covered with a reflective layer.

8. The device of claim 1, further comprising:
a port disposed in the housing, the port configured to receive an external connector and to convey at least a portion of the first modulated light signal into the connector for communication with an external device coupled to the external connector.

9. The device of claim 1, wherein the housing comprises a first portion, a second portion, and a hinge coupling the first portion of the housing to the second portion of the housing, wherein the first light emitter is disposed in the first portion of the housing and the first light receiver is disposed in the second portion of the housing, and wherein the device is configured to conduct at least the portion of the first modulated light signal from the first portion of the housing through the hinge to the first light receiver.

10. A system, comprising:
a first device comprising:
a housing, wherein at least a portion of the housing is transparent to light;
a first light emitter disposed in the housing and configured to, when directed by a first electrical signal comprising a plurality of bits, emit light having a first value of a first characteristic as a first modulated light signal representing at least a first bit of the first electrical signal, wherein the first device is configured to conduct the first modulated light signal through at least the portion of the housing that is transparent to light, and wherein the first characteristic is at least one of a first wavelength, a first polarization, and a first intensity;
a second light emitter disposed in the housing and configured to, when directed by the first electrical signal, emit light having a second value of the first characteristic as a second modulated light signal representing at least a second bit of the first electrical signal, wherein the first device is configured to conduct the second modulated light signal through at least the portion of the housing that is transparent to light;
a first electronic component disposed in the housing and configured to provide the first electrical signal to the first light emitter and the second light emitter; and
a port disposed in the housing; and
a second device comprising:
a connector configured to be coupled to the port of the first device and to receive the first modulated light signal and the second modulated light signal;
a first light receiver configured to receive at least a first portion of the first modulated light signal and at least a second portion of the second modulated light signal from the housing and convert at least the received first and second portions into at least first and second bits, respectively, of a second electrical signal; and
a second electronic component disposed in the second device and configured to receive the second electrical signal from the first light receiver.

11. The system of claim 10, wherein the second device comprises a conduit coupled to the connector and to a remainder of the second device.

12. The system of claim 10, wherein the first light receiver is disposed in the connector.

13. The system of claim 10, wherein the second device further comprises a third light emitter configured to, when directed by a third electrical signal, emit light as a third modulated light signal, wherein the first device is configured to receive and conduct the third modulated light signal through the port to the housing of the first device.

14. The system of claim 13, wherein the third light emitter is disposed in the connector.

15. A method of transmitting a signal between components of a device, the method comprising:
converting a first electrical signal from a first electronic component disposed within the device into a first modulated light signal comprising light having a first value of a first characteristic, wherein the first electrical signal comprises a plurality of bits, the first modulated light signal represents at least a first bit of the first electrical signal, and the first characteristic is at least one of a first wavelength, a first polarization, and a first intensity;
emitting the first modulated light signal into a housing of the device from a first light emitter disposed within the device;
converting the first electrical signal into a second modulated light signal comprising light having a second value of the first characteristic, wherein the second modulated light signal represents at least a second bit of the first electrical signal;
emitting the second modulated light signal into the housing of the device from a second light emitter disposed within the device;
conducting the first and second modulated light signals through at least a portion of the housing;
receiving at least a first portion of the first modulated light signal and at least a second portion of the second modulated light signal at a first light receiver disposed within the housing of the device; and
converting at least the received first and second portions into at least first and second bits, respectively, of a second electrical signal.

16. The method of claim 15, further comprising:
converting a third electrical signal into a third modulated light signal having a third value of a second characteristic, wherein the second characteristic is at least one of a second wavelength, a second polarization, and a second intensity;
emitting the third modulated light signal into the housing of the device from a third light emitter disposed within the device;
conducting the third modulated light signal through at least the portion of the housing; and
receiving at least a portion of the third modulated light signal at a second light receiver disposed within the housing of the device.

17. The method of claim 16, further comprising:
converting at least the received portion of the third modulated light signal into at least a third bit of the second electrical signal.

18. The method of claim 15, further comprising:
receiving at least a portion of the first modulated light signal in a connector inserted into a port in the housing of the device;
converting at least the received portion of the first modulated light signal into a third electrical signal; and
providing the third electrical signal to a component of an external device.

19. The method of claim 18, further comprising:
conducting a third modulated light signal from the connector into the housing;
receiving at least a portion of the third modulated light signal at a second light receiver disposed in the housing; and
converting at least the received portion of the third modulated light signal into a fourth electrical signal.

20. The method of claim 19, further comprising:
emitting the third modulated light signal from a light emitter disposed in the connector and responsive to an electrical signal from the external device.

* * * * *